US007844558B2

(12) United States Patent
Yuan et al.

(10) Patent No.: US 7,844,558 B2

(45) Date of Patent: Nov. 30, 2010

(54) INCREMENTAL LEARNING OF NONLINEAR REGRESSION NETWORKS FOR MACHINE CONDITION MONITORING

(75) Inventors: Chao Yuan, Secaucus, NJ (US); Claus Neubauer, Monmouth Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 598 days.

(21) Appl. No.: 11/866,554

(22) Filed: Oct. 3, 2007

(65) Prior Publication Data

US 2008/0086437 A1 Apr. 10, 2008

Related U.S. Application Data

(60) Provisional application No. 60/849,702, filed on Oct. 5, 2006.

(51) Int. Cl.
*G06F 17/00* (2006.01)
*G06N 5/00* (2006.01)

(52) U.S. Cl. ........................................ 706/45; 706/62

(58) Field of Classification Search .................. 706/45, 706/62

See application file for complete search history.

(56) References Cited

U.S. PATENT DOCUMENTS 6,157,921 A * 12/2000 Barnhill ...................... 706/16

OTHER PUBLICATIONS

Kristin P. Bennett, Michinari Momma, and Mark J. Embrechts, “MARK: A Boosting Algorithm for Heterogeneous Kernel Models”, SIGKDD ’02, Edmonton, Alberta, Canada 2002, pp. 24-31.*

Andrei V. Gribok, J. Wesley Hines, Robert E. Ehrig, “Use of Kernel Based Techniques for Sensor Validation in Nuclear Power Plants”, Int’l Topical Meeting on Nuclear Plant Instrumentation, Controls, and Human-Machine interface Technologies, Washington, DC, Nov. 2002, pp. 1-15.*

Aleksander Kolcz and Nigel M. Allinson, “N-tuple Regression Network”, Neural Networks, vol. 9, No. 5, pp. 855-869, 1996.*

* cited by examiner

*Primary Examiner*—Michael B. Holmes
*Assistant Examiner*—Vincent M Gonzales

(57) ABSTRACT

A method for identifying a potential fault in a system includes obtaining a set of training data. A first kernel is selected from a library of two or more kernels and the first kernel is added to a regression network. A next kernel is selected from the library of two or more kernels and the next kernel is added to the regression network. The regression network is refined. A potential fault is identified in the system using the refined regression network.

15 Claims, 6 Drawing Sheets

INCREMENTAL LEARNING OF NONLINEAR REGRESSION NETWORKS FOR MACHINE CONDITION MONITORING

CROSS-REFERENCE TO RELATED APPLICATION

The present application is based on provisional application Ser. No. 60/849,702 filed Oct. 5, 2006, the entire contents of which are herein incorporated by reference.

BACKGROUND OF THE INVENTION

1. Technical Field

The present disclosure relates to machine condition monitoring and, more specifically, to incremental learning of nonlinear regression networks for machine condition monitoring.

2. Discussion of the Related Art

Condition monitoring relates to the observation and analysis of one or more sensors that sense key parameters of machinery. By closely observing the sensor data, a potential failure or inefficiency may be detected and remedial action may be taken, often before a major system failure occurs.

Effective condition monitoring may allow for increased uptime, reduced costs associated with failures, and a decreased need for prophylactic replacement of machine components.

Condition monitoring may be applied to a wide variety of industrial machinery such as capitol equipment, factories and power plants; however, condition monitoring may also be applied to other mechanical equipment such as automobiles and nonmechanical equipment such as computers. In fact, principals of condition monitoring may be applied more generally to any system or organization. For example, principals of condition monitoring may be used to monitor the vital signs of a patient to detect potential health problems. For example, principals of condition monitoring may be applied to monitor performance and/or economic indicators to detect potential problems with a corporation or an economy.

In condition monitoring, one or more sensors may be used. Examples of commonly used sensors include vibration sensors for analyzing a level of vibration and/or the frequency spectrum of vibration. Other examples of sensors include temperature sensors, pressure sensors, spectrographic oil analysis, ultrasound, and image recognition devices.

A sensor may be a physical sensory device that may be mounted on or near a monitored machine component or a sensor may more generally refer to a source of data.

Conventional techniques for condition monitoring acquire data from the one or more sensors and analyze the collected data to detect when the data is indicative of a potential fault. Inferential sensing is an example of an approach that may be used to determine when sensor data is indicative of a potential fault.

In inferential sensing, an expected value for a particular sensor is estimated, for example, through the use of other sensors, and an actual sensor value is observed. The actual sensor value may then be compared to the expected sensor value, and the larger the difference between the two values, the greater the likelihood of a potential fault.

As calculating the expected value for a particular sensor may involve a large number of inputs, a regression network may be used to return one output for M number of inputs. A simple example of a regression network is a linear regression model. In such cases, the expected value is calculated based on a linear relationship of the M inputs. However, in practical use, a linear regression model may be insufficient to properly represent the relationship between the M inputs and the estimated expected value.

SUMMARY

A method for identifying a potential fault in a system includes obtaining a set of training data. A first kernel is selected from a library of two or more kernels and the first kernel is added to a regression network. A next kernel is selected from the library of two or more kernels and the next kernel is added to the regression network. The regression network is refined. A potential fault is identified in the system using the refined regression network.

Selecting a next kernel from the library of kernels and adding the next kernel to the regression network may be repeated until a regression error has been reduced to a predetermined level. Alternatively, selecting a next kernel from the library of kernels and adding the next kernel to the regression network may be repeated until a regression error has been minimized.

The first kernel may be selected from among the library of kernels by calculating a cost function for each of the kernels of the library and selecting the kernel that results in a lowest cost function. The next kernel may be selected from among the library of kernels by calculating a cost function for each of the kernels of the library and selecting the kernel that results in a lowest cost function.

Refining the regression network may include removing the first kernel from the regression network and selecting a replacement first kernel from the library of kernels and adding the replacement first kernel to the regression network, and removing the next kernel from the regression network and selecting a replacement next kernel from the library of kernels and adding the replacement next kernel to the regression network.

Selecting a next kernel from the library of kernels and adding the next kernel to the regression network may be repeated until a regression error has been reduced to a predetermined level. Removing the next kernel from the regression network and selecting a replacement next kernel from the library of kernels and adding the replacement next kernel to the regression network may be repeated for each next kernel that has been added to the regression network.

Refining the regression network may additionally include repeating the steps of removing and replacing the first kernel from the regression network and removing and replacing the next kernel from the regression network until a cost function is minimized. Alternatively, refining the regression network may additionally include repeating the steps of removing and replacing the first kernel from the regression network and sequentially removing and replacing each of the next kernels from the regression network until a cost function is minimized.

The library of kernels may include a linear kernel, a Gaussian kernel, a polynomial kernel, quadratic kernel, or a sigmoid kernel.

Identifying a potential fault in the system using the refined regression network may include obtaining operational sensor data, estimating an expected monitored sensor value based on the operational sensor data and the refined regression network, obtaining an actual value from the monitored sensor, and identifying a potential fault when the actual value of the monitored sensor deviates from the expected monitored sensor value by more than a predetermined tolerance level.

A system for identifying potential faults in a machine includes a training data database including set of training data. A kernel database includes two or more kernels. A selection unit selects a kernel from a library of two or more kernels and adds the kernel to a regression network. A refining unit refines the regression network. A set of sensors monitors attributes of the machine. An identification unit identifies a potential fault in the machine using the refined regression network and data obtained from the set of sensors.

Selecting a next kernel from the library of kernels and adding the next kernel to the regression network may be repeated until a regression error has been reduced to a predetermined level. Alternatively, selecting a next kernel from the library of kernels and adding the next kernel to the regression network may be repeated until a regression error has been minimized.

The first kernel is selected from among the library of kernels by calculating a cost function for each of the kernels of the library and selecting the kernel that results in a lowest cost function. The next kernel may be selected from among the library of kernels by calculating a cost function for each of the kernels of the library and selecting the kernel that results in a lowest cost function.

Refining the regression network may include removing the first kernel from the regression network and selecting a replacement first kernel from the library of kernels and adding the replacement first kernel to the regression network, and removing the next kernel from the regression network and selecting a replacement next kernel from the library of kernels and adding the replacement next kernel to the regression network.

Selecting a next kernel from the library of kernels and adding the next kernel to the regression network may be repeated until a regression error has been reduced to a predetermined level. Removing the next kernel from the regression network and selecting a replacement next kernel from the library of kernels and adding the replacement next kernel to the regression network may be repeated for each next kernel that has been added to the regression network.

Refining the regression network may additionally include repeating the steps of removing and replacing the first kernel from the regression network and removing and replacing the next kernel from the regression network until a cost function is minimized. Alternatively, refining the regression network may additionally include repeating the steps of removing and replacing the first kernel from the regression network and sequentially removing and replacing each of the next kernels from the regression network until a cost function is minimized.

The library of kernels may include a linear kernel, a Gaussian kernel, a polynomial kernel, quadratic kernel, or a sigmoid kernel.

Identifying a potential fault in the system using the refined regression network may include obtaining operational sensor data, estimating an expected monitored sensor value based on the operational sensor data and the refined regression network, obtaining an actual value from the monitored sensor, and identifying a potential fault when the actual value of the monitored sensor deviates from the expected monitored sensor value by more than a predetermined tolerance level.

A computer system includes a processor and a program storage device readable by the computer system, embodying a program of instructions executable by the processor to perform method steps for identifying a potential fault in a system. The method includes obtaining a set of training data, selecting a first kernel from a library of two or more kernels and adding the first kernel to a regression network, selecting a next kernel from the library of two or more kernels and adding the next kernel to the regression network, refining the regression network, and identifying a potential fault in the system using the refined regression network.

Selecting a next kernel from the library of kernels and adding the next kernel to the regression network may be repeated until a regression error has been minimized or reduced to a predetermined level.

The first kernel and the next kernel may each be selected from among the library of kernels by calculating a cost function for each of the kernels of the library and selecting the kernel that results in a lowest cost function.

Refining the regression network may include removing the first kernel from the regression network and selecting a replacement first kernel from the library of kernels and adding the replacement first kernel to the regression network, and removing the next kernel from the regression network and selecting a replacement next kernel from the library of kernels and adding the replacement next kernel to the regression network.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE DRAWINGS

Figure 1:
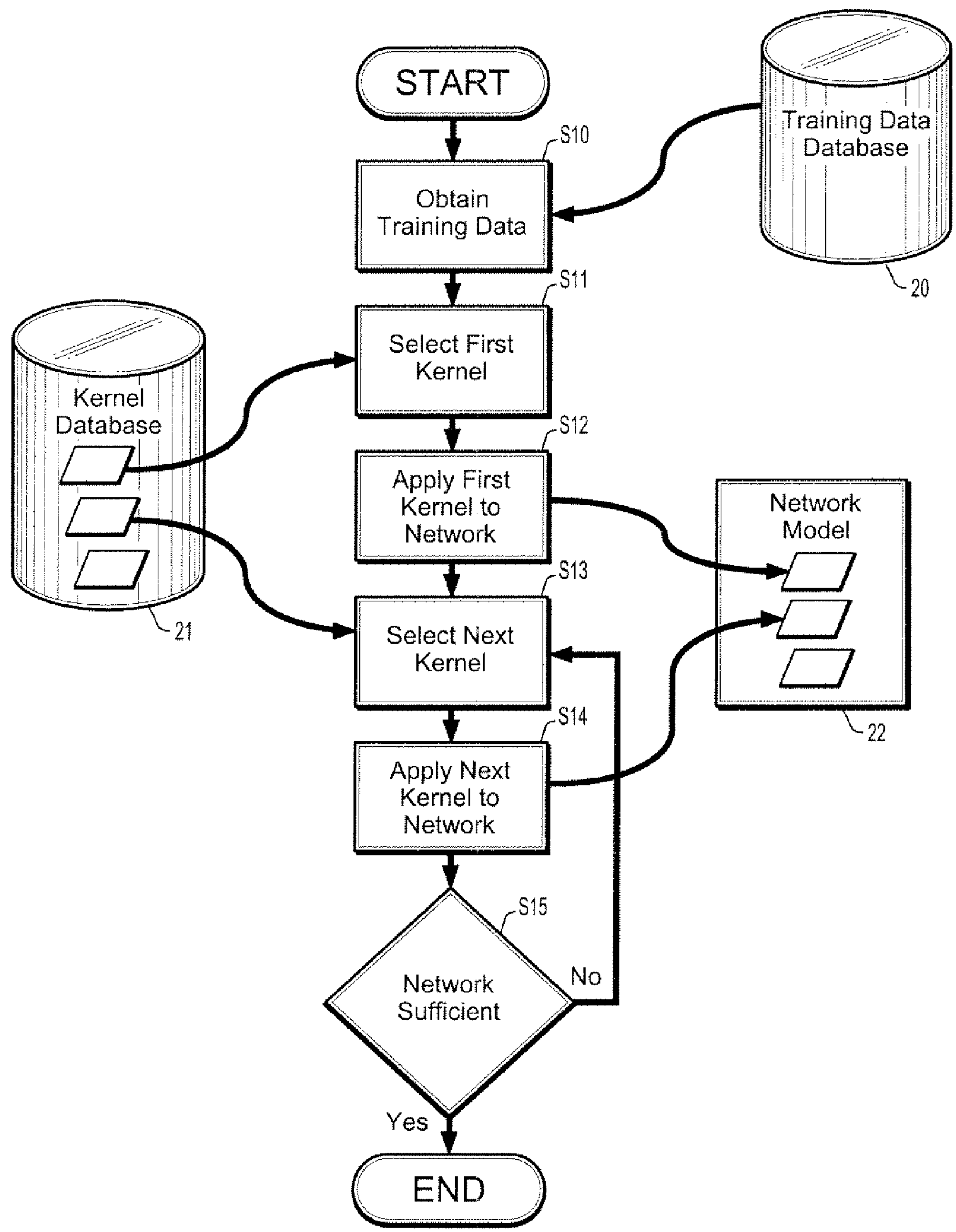
FIG. 1 is a flow chart illustrating a boosting process for initially building a nonlinear regression network according to an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide approaches to condition monitoring where an expected sensor value is estimated based on nonlinear models. An observed sensor value may then be compared to the estimated sensor value to detect a potential fault in a machine or other system under monitoring.

The relationship between observed sensor values and expected sensor values may be established by a set of training data. The training data represents sensor values taken during the proper function of the system under monitoring. It is thus assumed that during the training period, the system under monitoring is functioning normally, and the observed sensor values are consistent with normal fault-free operation.

The training data may be obtained experimentally, for example by running the system under monitoring and reading sensor data. Alternatively or additionally, training data may be imported from external sources. Imported training data may have been obtained from a similar system to the system under monitoring. Accordingly, similar systems may share training data.

After the training data is obtained, the data may be analyzed to determine the relationship between the data of the various sensors. For example, it may be determined how the values of a set of sensors change with respect to a change in a particular sensor. This relationship may be instantiated as a plot of data points mapping the relationship of the various sensors of the training data. The training data plot may then be expressed as a mathematical relationship so that subsequently observed sensor values may be used to generate estimated expected sensor values. The process of fitting a mathematical relationship to the shape of the training data plot is known as regression. Because we are concerned with estimating an expected value for a particular sensor based on an observed set of one or more observed sensor values, we may use a regression network to establish the mathematical relationship for the data of each sensor. The regression network may use observed sensor data as an M number of inputs and may return an estimated expected sensor value.

Exemplary embodiments of the present invention are concerned with the regression of the training data to determine the generalized relationship of each sensor value with respect to one or more inputs. Finding such a generalized relationship may later be used to estimate an expected sensor value.

One simple approach to performing this regression is to utilize a linear model. In such an approach, linear regression is performed to fit the data to a line. The correlations among the sensors may be nonlinear and thus the simple linear regression may not be sufficient to accurately establish the generalized relationship that may yield accurate estimation of expected sensor values.

Accordingly, nonlinear models may be used to more closely correlate nonlinearity. Examples of suitable nonlinear models include kernel regression, multivariate state estimation techniques (MSET), and support vector regression (SVR). In these techniques, the network of generalized relationships f(x) is expressed as a linear combination of a single kernel function:

$$y = f(x) = \sum_{m=1}^{M} K(x, \theta_m) \tag{1}$$

where x is the input vector and y is the output. K(,) is the single kernel function and my be, for example, a Gaussian kernel, a polynomial kernel, etc. $\theta_m$ represents the kernel parameter.

When performing kernel regression as a linear combination of a single kernel, it may be difficult to effectively fit the data at various points along the data plot. Accordingly, one portion of the plot may be effectively fit, while another portion of the plot may be ineffectively fit. Such a regression may lead to poor approximation of expected values under certain conditions. Moreover, it may be difficult to obtain the various kernel parameters. Without proper parameter selection, a regression network may work well for one set of data but may work poorly for another set of data.

Accordingly, exemplary embodiments of the present invention provide an incremental learning strategy for building a nonlinear regression network from one or more kernels of a kernel library.

The network may initially be built by boosting. FIG. 1 is a flow chart illustrating a boosting process for initially building a nonlinear regression network according to an exemplary embodiment of the present invention. First, training data may be obtained (Step S10). The training data may be obtained, for example, by operating the machinery under monitoring when it is known that no faults exist. Alternatively, the training data may be obtained from a training data database 20, for example, over a computer network. Then, a first kernel is selected from a library of kernels 21 (Step S11) and the selected kernel is added to the network 22 (Step S12). The first kernel may be selected by determining which of the plurality of kernels of the library best fits the training data. Then, the next kernel may be selected from the library 21 (Step S13). The next kernel may be the same kernel as the first kernel or the next kernel may be different than the first kernel. The next kernel may then be added to the network 22 (Step S14). The next kernel may be selected according to which kernel of the library of kernels 22 best fits the residues of the network after the preceding kernel(s) have been added. The residues are those aspects of the network that deviate from the training data. Then, the process of selecting an additional kernel (Step S13) based on the residues and adding the selected kernel to the network 22 (Step S14) may be repeated until the network sufficiently represents the generalized relationships of the training data (Yes, Step S15).

After the network has been boosted (Steps S10-S15), the network may be refined, for example, using a leave-one-out method. According to such an approach, the established network is refined by removing one of the kernels from the network, and a replacement kernel is selected from the library of kernels and added to the network. The replacement kernel is selected according to which kernel of the library of kernels best fits the residues of the network. If the removed kernel is the best fit then the removed kernel may be added back to the network. One by one, each kernel in the network may be replaced where a better kernel is available. After each kernel has been checked for possible replacement, the process may be repeated until there is a satisfactory convergence between the training data and the network.

As indicated above, a library of candidate kernels may be defined and one or more distinct candidate kernels may be selected from the library of kernels and added to the network. Each of the candidate kernels may have one or more parameters θ that may be optimized to provide the most effective use of the kernel when applied to the network. For example, if the kernel is a Gaussian kernel, then the parameter θ may represent the width of the Gaussian kernel. Accordingly, a kernel may be represented as K(x,θ) where x is the input. The regression network of the selected kernels may be represented as g(x).

The library may contain any type of known kernel. Examples of known kernels that may be used as candidate kernels in the library include:

Linear Kernel:

$$K_{linear}(x,[ab])=a^T x+b, \text{ where } \theta[ab] \tag{2}$$

Gaussian Kernel:

$$K_{Gau}(x,[k\beta c])=k\exp(-\beta\|x-c\|^2), \text{ where } \theta=[k\beta c] \tag{3}$$

Other possible kernels include a quadratic kernel, sigmoid kernel, polynomial kernel, etc. Kernels may be included within the library of kernels as dictated by the nature of the condition monitoring intended to be performed.

In performing the boosting operation, the regression network g(x) may be trained from a set of training data expressed as $\{x_i,y_i\}_{i=1:N}$, where N is the number of training data points. The regression network may be defined as a linear combination of M number of kernels:

$$g(x) = \sum_{m=1}^{M} K_m(x, \theta_m) \tag{4}$$

The g(x) of equation (4) may differ from the f(x) of equation (1) because the kernels of g(x) may belong to different types. For example, one kernel may be a linear kernel and another kernel may be a Gaussian kernel. Accordingly, g(x) may have the flexibility needed to fit training data.

The residue of the network at the ith training data point is defined as:

$$r_i=y_i-g(x_i) \tag{5}$$

In boosting the network, a suitable boosting strategy may be used. For example, boosting may be performed as discussed in J. Friedman (1999), "Greedy Function Approximation: A Gradient Boosting Machine," Technical Report, Dept. of Statistics, Stanford University, which is incorporated by reference herein. The boosting strategy may be employed to incrementally build g(x) by adding kernels from the kernel library. In determining at each step which kernel of the kernel library is to be added to g(x), each kernel of the library may be temporarily added to the network and the quality of the network assessed. The kernel that has the greatest increase on the quality of the network may be selected. The quality of the network may be assessed by analyzing a cost function, for example, the cost function of equation 6.

Accordingly, the kernel K(,) that minimizes the following cost function may be selected from the kernel library to be added to the network g(x):

$$\sum_{i=1}^{N} \|K(x_i, \theta) - r_i\|^2 \tag{6}$$

where $r_i$ is the residue produced by the network at its current state.

In determining when boosting may be stopped, it may be determined how well the network fits the training data. The quality of the network may be ascertained by calculating an error value representing how far the network deviates from the test data. Any known measure of regression error may be used. For example, mean squared error (MSE) may be used to represent the fit of the network to the training data:

$$MSE = \sum_{i=1}^{N} r_i^2 \tag{7}$$

Accordingly, boosting may be stopped when the MSE is sufficiently small, for example, when the MSE falls below a predetermined value. Thus the number of kernels i that are applied to the network may be determined by the boosting operation.

As discussed above, in refining the network, a leave-one-out approach may be used to increase network fit. In this approach, one-by-one a kernel may be removed from the network. We may call the removed kernel the $m^{th}$ kernel and thus the network without the $m^{th}$ kernel may be referred to as $g_{/m}(x)$. The $m^{th}$ kernel may then be replaced with a new kernel K selected from the kernel library. The new kernel may be selected according to minimizing the following cost function:

$$\sum_{i=1}^{N} \|K(x_i, \theta) - (y_i - g_m(x_i))\|^2 \tag{8}$$

where $y_i-g_{/m}(x)$ is the residue of as $g_{/m}(x)$ at the $i^{th}$ data point. Replacement may be performed for each of the M kernels. The leave-one-out process may then be repeated for all kernels until satisfactory convergence is achieved.

FIGS. 2-5 illustrate an approach to network regression of training data according to an exemplary embodiment of the present invention. In this example, condition monitoring is performed on a gas turbine. Sensor data is provided by a pressure sensor configured to observe shell pressure. While multiple sensors may be used, here a single sensor is used for simplicity. The sensor data is used to predict turbine power. Thus condition monitoring would include estimating expected turbine power based on the observed shell pressure and then the estimated expected turbine power would be compared to the actual sensed turbine power to determine whether the difference between these two values is indicative of a potential fault.

The training data includes multiple points, with each point indicating an observed relationship between a shell pressure and a turbine power. In this example, the kernel library includes two kernels, a linear kernel and a Gaussian kernel.

Figure 2:
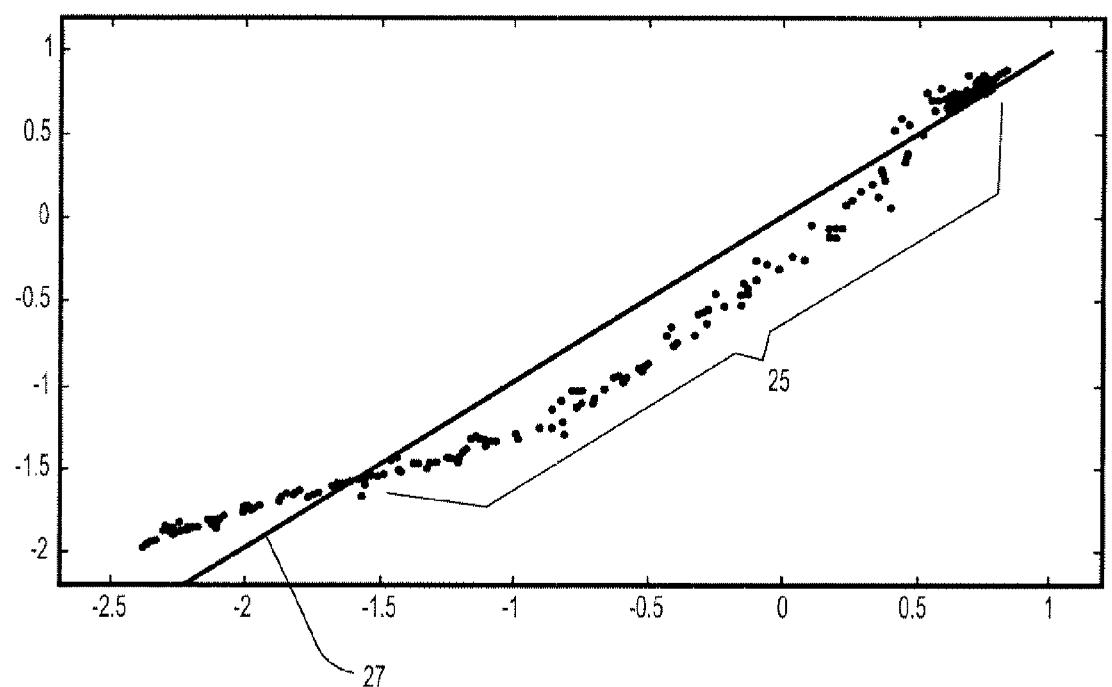
FIG. 2 illustrate is a plot showing a distribution of normalized training data illustrating the observed relationship between shell pressure and turbine power according to an exemplary embodiment of the present invention.

FIG. 2 is a plot showing a distribution of normalized training data illustrating the observed relationship between shell pressure and turbine power. Upon performing a first round of boosting, for example, as described above, the linear kernel may be selected and added to the network. As can be seen form FIG. 2, the linear kernel is fitted to the training data 25 according to the present example. The training data 25 includes a series of data points, where each point indicates a correlation between a vale of a first sensor (x-axis) and a corresponding value of a second sensor (y-axis). Here, the sensors sense shell pressure and turbine power. Accordingly, the training data 25 is indicative of a relationship between the first sensor and the second sensor.

The network 27 includes only the linear kernel and thus appears as a straight line roughly fitting the training data 25. In the next round of boosting, the Gaussian kernel is selected and added to the network that already includes the linear kernel.

Figure 3:
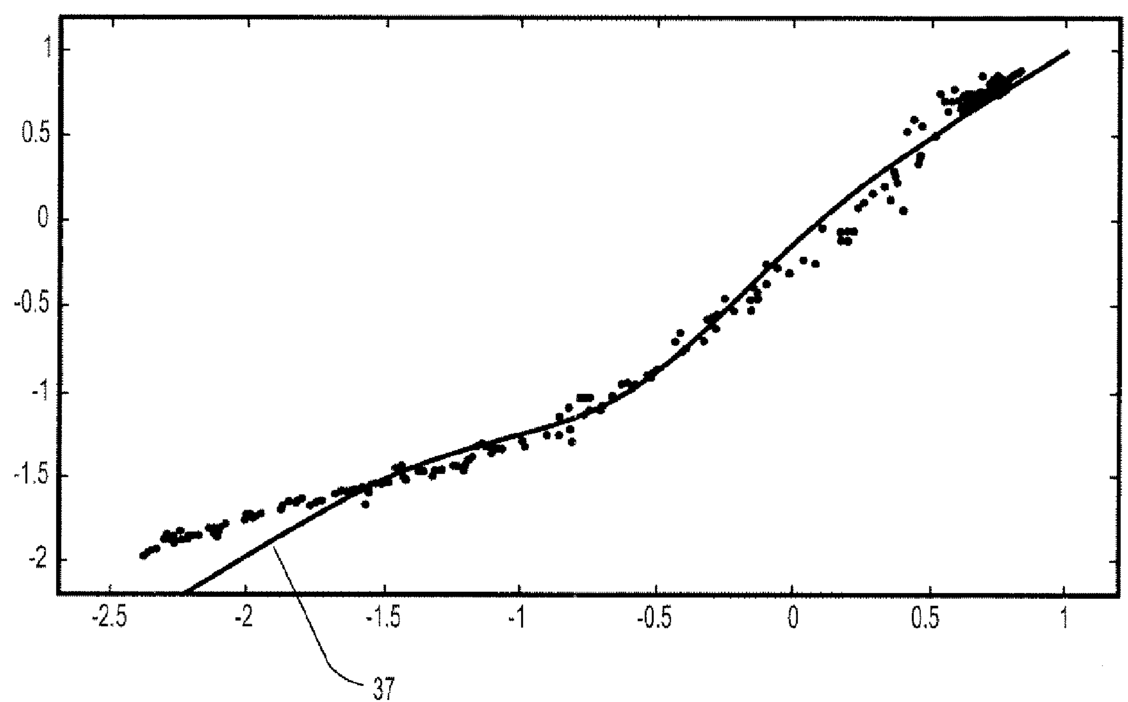
FIG. 3 shows the fit of the network including the linear kernel and the Gaussian kernel according to an exemplary embodiment of the present invention.

FIG. 3 shows the fit of the network including the linear kernel and the Gaussian kernel according to the present example. It is clear from FIG. 3 that there is a closer fit between the network 37 and he training data as compared with the network 27 of FIG. 2.

The boosting process may continue as additional kernels are added. The same type of kernel may be added more than once, either with the same parameters or different parameters and/or different types of kernels may be added.

Figure 4:
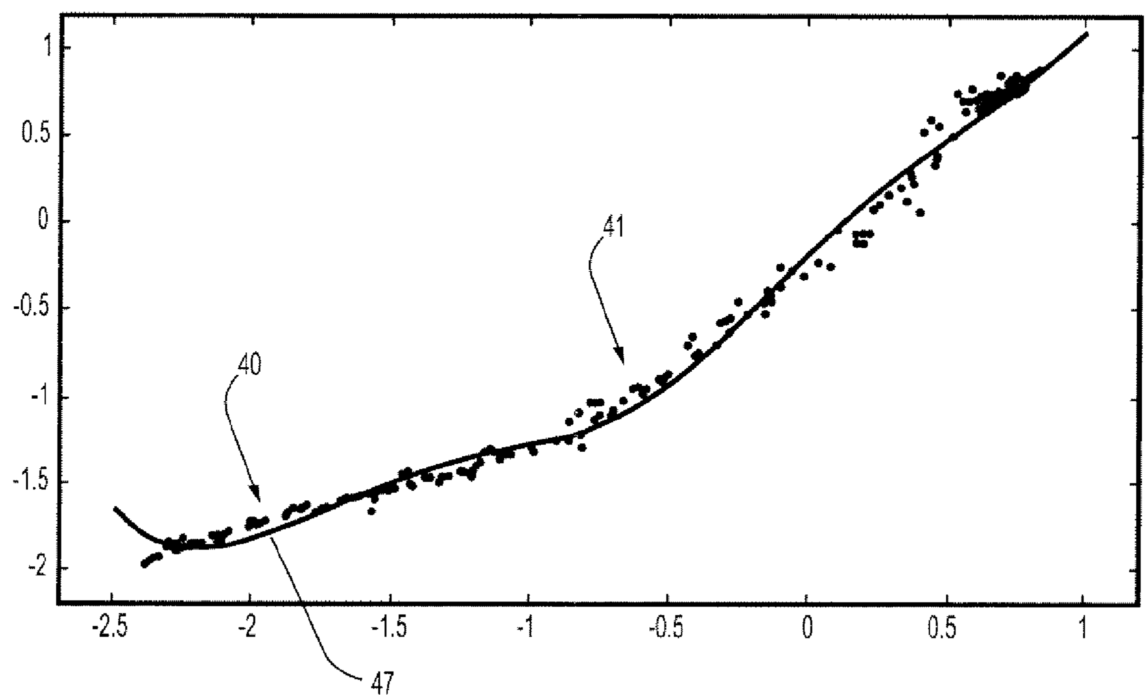
FIG. 4 shows the fit of the network after boosting has been completed according to an exemplary embodiment of the present invention.

FIG. 4 shows the fit of the network after boosting has been completed according to the present example. It can be seen from FIG. 4 that there may still be misfit areas 40 and 41 between the network 47 and the training data 25 after boosting has been completed.

Figure 5:
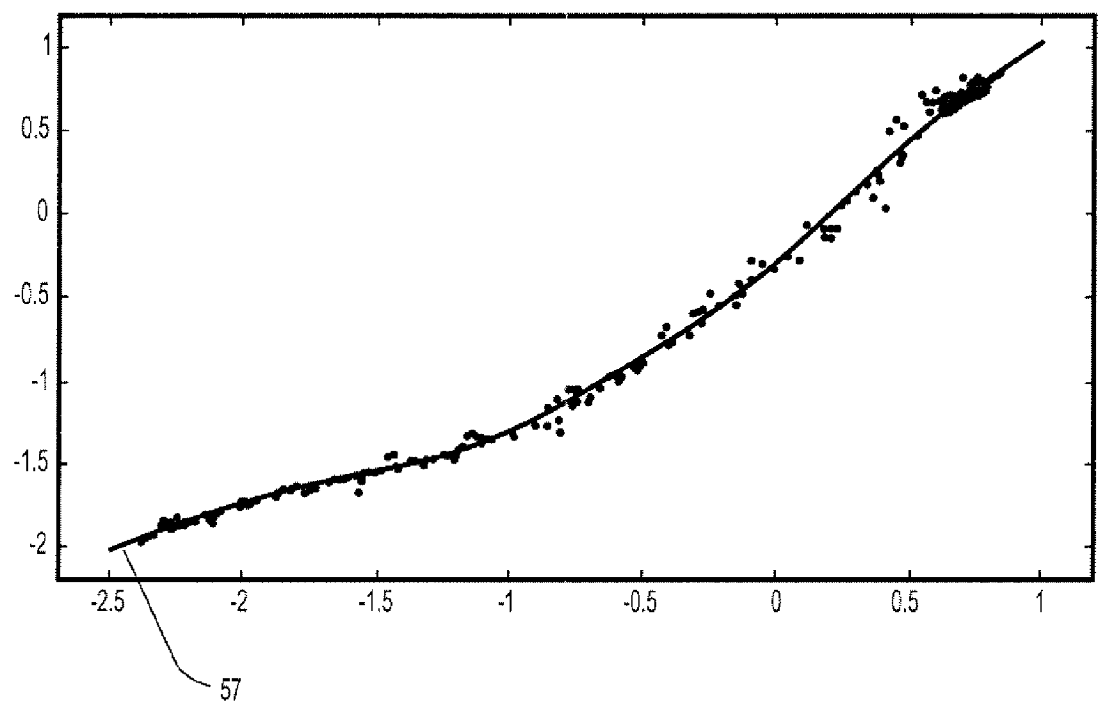
FIG. 5 shows the fit of the network 57 after refining according to an exemplary embodiment of the present invention.

Accordingly, refining may be performed, for example, as described above. FIG. 5 shows the fit of the network 57 after refining according to the present example.

Figure 6:
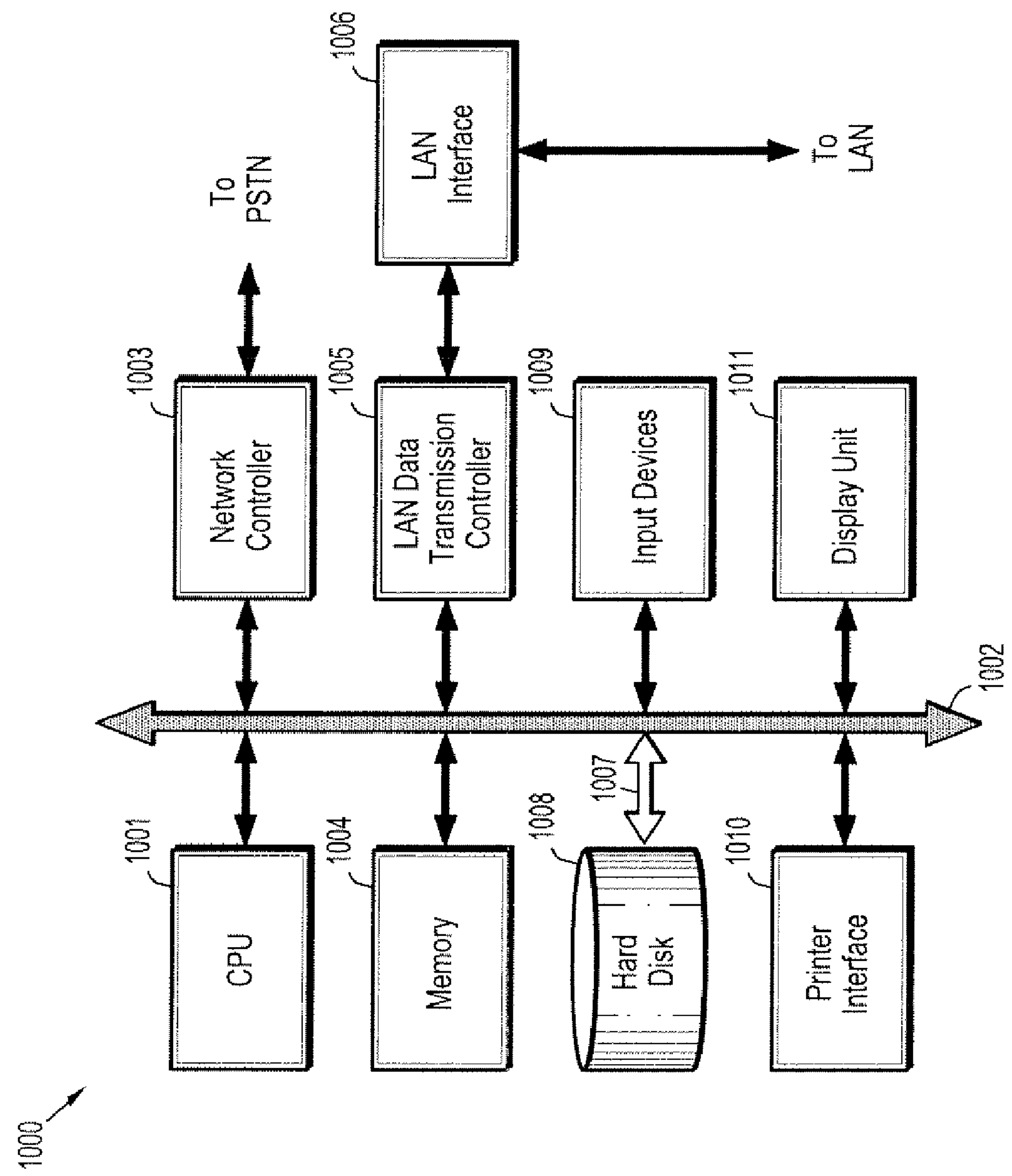
FIG. 6 shows an example of a computer system which may implement a method and system of the present disclosure.

FIG. 6 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for identifying a potential fault in a system, comprising:

obtaining a set of training data;

selecting a first kernel from a library of two or more kernels and adding the first kernel to a regression network;

selecting a next kernel from the library of two or more kernels and adding the next kernel to the regression network;

refining the regression network using a leave-one-out method in which the regression network is iteratively improved by removing a single kernel from the regression network and replacing the removed kernel with a replacement kernel from the library of kernels and then repeating the removing and replacing steps for the kernels of the regression network until a desired level of convergence between the training data and the regression network is achieved; and identifying a potential fault in the system using the refined regression network.

2. The method of claim 1, wherein the step of selecting a next kernel from the library of kernels and adding the next kernel to the regression network is repeated until a regression error has been reduced to a predetermined level.

3. The method of claim 1, wherein the step of selecting a next kernel from the library of kernels and adding the next kernel to the regression network is repeated until a regression error has been minimized.

4. The method of claim 1, wherein the first kernel is selected from among the library of kernels by calculating a cost function for each of the kernels of the library and selecting the kernel that results in a lowest cost function.

5. The method of claim 1, wherein the next kernel is selected from among the library of kernels by calculating a cost function for each of the kernels of the library and selecting the kernel that results in a lowest cost function.

6. The method of claim 1, wherein refining the regression network additionally comprising repeating the steps of removing and replacing a kernel from the regression network until a cost function is minimized.

7. The method of claim 1, wherein the library of kernels includes a linear kernel, a Gaussian kernel, a polynomial kernel, quadratic kernel, or a sigmoid kernel.

8. The method of claim 1, wherein the step of identifying a potential fault in the system using the refined regression network comprises:

obtaining operational sensor data;

estimating an expected monitored sensor value based on the operational sensor data and the refined regression network;

obtaining an actual value from the monitored sensor; and identifying a potential fault when the actual value of the monitored sensor deviates from the expected monitored sensor value by more than a predetermined tolerance level.

9. A system for identifying potential faults in a machine, comprising:

a training data database including set of training data;

a kernel database including two or more kernels;

a selection unit for selecting a kernel from a library of two or more kernels and adding the kernel to a regression network;

a refining unit for refining the regression network using a leave-one-out method in which the regression network is iteratively improved by removing a single kernel from the regression network and replacing the removed kernel with a replacement kernel from the library of kernels and then repeating the removing and replacing steps for the kernels of the regression network until a desired level of convergence between the training data and the regression network is achieved;

a set of sensors for monitoring attributes of the machine; and an identification unit for identifying a potential fault in the machine using the refined regression network and data obtained from the set of sensors.

10. The system of claim 9, wherein the selection unit repeats the selecting of a kernel and adding the selected kernel to the regression network until a regression error has been minimized or reduced to a predetermined level.

11. The system of claim 9, wherein the selection unit selects a kernel from among the library of kernels by calculating a cost function for each of the kernels of the library and selecting the kernel that results in a lowest cost function.

12. The system of claim 9, wherein the refining unit repeats the refining process until a regression error has been reduced to a predetermined level or a cost function is minimized.

13. A computer system comprising:

a processor; and a program storage device readable by the computer system, embodying a program of instructions executable by the processor to perform method steps for identifying a potential fault in a system, the method comprising:

obtaining a set of training data;

selecting a first kernel from a library of two or more kernels and adding the first kernel to a regression network;

selecting a next kernel from the library of two or more kernels and adding the next kernel to the regression network;

refining the regression network using a leave-one-out method in which the regression network is iteratively improved by removing a single kernel from the regression network and replacing the removed kernel with a replacement kernel from the library of kernels and then repeating the removing and replacing steps for the kernels of the regression network until a desired level of convergence between the training data and the regression network is achieved; and identifying a potential fault in the system using the refined regression network.

14. The computer system of claim 13, wherein the step of selecting a next kernel from the library of kernels and adding the next kernel to the regression network is repeated until a regression error has been minimized or reduced to a predetermined level.

15. The computer system of claim 13, wherein the first kernel and the next kernel are each selected from among the library of kernels by calculating a cost function for each of the kernels of the library and selecting the kernel that results in a lowest cost function.

* * * * *